United States Patent [19]
Matsumoto

[11] 3,810,217
[45] May 7, 1974

[54] SWITCH OPERATING DEVICE FOR PHOTOGRAPHIC CAMERAS

[75] Inventor: Toshiaki Matsumoto, Amagasaki, Japan

[73] Assignee: Minolta Camera Kabushiki Kaisha, Osaka-shi, Osaka-fu, Japan

[22] Filed: May 31, 1972

[21] Appl. No.: 258,302

[30] Foreign Application Priority Data
June 1, 1971   Japan.............................. 46-37459

[52] U.S. Cl. .................................................. 354/204
[51] Int. Cl. .................................................. G03b 19/04
[58] Field of Search ................. 95/10 C, 11 R, 31 R

[56] References Cited
UNITED STATES PATENTS
3,367,251   2/1968   Furuta .................................... 95/10

*Primary Examiner*—Samuel S. Matthews
*Assistant Examiner*—Michael L. Gellner
*Attorney, Agent, or Firm*—Watson, Cole, Grindle & Watson

[57] ABSTRACT

In a photographic camera having a battery power source and an electric circuit includes a normally closed power source switch and an operating button for opening the power source switch. A retaining member retains the power source switch in an open condition when the operating button is operated. A winding lever is movable between a rest position and an operating position and actuates the retaining member when the winding lever is at its rest position to retain the operating button in a position wherein the power source switch is open. When the winding lever is at its operating position the retention of the operating button is released.

11 Claims, 9 Drawing Figures

SWITCH OPERATING DEVICE FOR PHOTOGRAPHIC CAMERAS

BACKGROUND OF THE INVENTION

In known electrical exposure controlling devices, a constant voltage power source is required so that a mercury battery or the like is exchangeably mounted within a conventional camera. Connecting the power source battery continuously to an electrical controlling circuit accelerates the consumption of the power source battery. To prevent that, a manually opened or closed switch is provided to be connected in series to the electric power source so that when the camera is not being used the switch is kept open and only when the camera is used is the switch closed. However, in such a case, if the swithc is not opened when the camera is not used, the consumption of the power source battery occurs, and also a photograph will not be taken if the switch is not closed when the camera is to be used.

In the present invention, the above mentioned drawbacks are removed.

THE OBJECTS OF THE INVENTION

One object of the present invention is to provide a power source switch which is reliably closed when the camera is used.

Another object of the present invention is to provide a power source switch which opens the connection between an electric power source and an electrical controlling circuit or the like when the camera is not used, reliably maintains the opened condition of the switch while the camera is not used, and reliably closes the switch when the camera is used.

Still another object of the present invention is to provide a switch operating mechanism for a photographic camera which maintains the opened condition of a power source switch connecting an electric power source to an electrical controlling circuit or the like when a winding lever is in the rest position and releases the power source switch when the winding lever is at its operating position.

A further object of the present invention is to provide a switch operating mechanism for a photographic camera which maintains a power source switch in an opened condition by an operating button when a winding lever is in its rest position, and effects the locking of a shutter release member.

And still another object of the present invention is to provide a switch operating mechanism for a photographic camera wherein a power source switch having a closing tendency is opened by depressing a push button projecting from the camera body, and the opened condition is kept by a retaining member interlocked with a film winding lever when the film winding lever is in its rest position. Once the winding lever is turned to its operating position prepared for winding up film, the aforementioned retention is released. After that release even though the winding lever is returned again to its rest position, the released condition is continued.

A final object of the present invention is to provide switch operating mechanism for a photographic camera wherein a power source switch is opened by depressing a push button projecting from the camera body and that push button is depressed by a cover of the camera case when the camera body is contained in the camera case; and the power source switch is opened and kept opened by a winding lever at its rest position.

SUMMARY OF THE INVENTION

In order to attain the objects mentioned above, the present invention relates to switch operating mechanism for a photographic camera, having a structure wherein between a power source battery and an electrical controlling circuit or the like, a power source switch having a closing tendency is provided in series with the power source battery. By operation of an operating button projecting from the camera body the power source switch is opened. When a winding lever, movable between a rest position and an operating position, is at its rest position, a retaining member interlocked with the winding lever retains the operating button to keep the power source switch in its opened condition.

The first feature of the present invention is that when the camera is being used, and when the winding lever is moved from its rest position to its operating position prepared for winding up film, the winding lever releases the retention of the operating button for opening the power source switch of the electrical controlling circuit and automatically closes the power source switch.

Another feature of the present invention is that the retaining member opens the power source switch for the electrical controlling circuit or the like in connection with the retention of the operating button and simultaneously locks the release operation of the shutter release member.

Still another feature of the present invention is that after the retention of the operating button is released by the turning of the winding lever to its operation position and the power source switch for the electrical controlling circuit or the like is closed, even though the winding lever is returned to its rest position, the closing of the power switch is maintained.

BRIEF DESCRIPTION OF THE DRAWINGS

FIGS. 7, 8 and 9 show the third embodiment in accordance with the present invention; wherein FIG. 7 is a plan view showing the condition wherein the winding lever is at its rest position, the operating button is operated, and the power source switch is kept in its opened condition; FIG. 8 is a plan view showing the winding lever at its operating position; and FIG. 9 shows the winding lever at its rest position but with the operating button not yet operated.

DESCRIPTION OF THE PREFERRED EMBODIMENT

Figure 1:
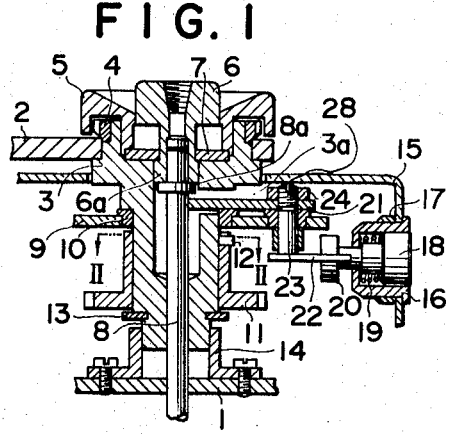
FIG. 1 is a longitudinal, sectional side view showing the formation of the essential portions of one embodiment in accomdance with the present invention, wherein the winding lever is at its rest position to retain the operating button in its operated position.

In FIG. 1 and FIGS. 3 to 5, reference numeral 1 denotes a camera body and on the top surface of camera body 1 winding lever 2 is provided. Winding lever 2 is fixed to winding shaft 3 by nut 4 and on a portion of winding shaft 3 notch 3a is formed. Reference numeral 5 denotes a cap and winding lever 2 is fixed to winding shaft 3 together with turning stop plate 7. Release button 6' movable, upwardly and downwardly, projects through the center of cap 5, and is prevented from rotating by turning stop plate 7 and is movable in the axial direction.

Release shaft 8 projects through the center of winding shaft 3 and is forced upwardly by a spring, not shown in the drawings but well known in the art. When release shaft 8 descends against the aforementioned spring force, it releases the shutter. Release shaft 8 has collar 8a on the upper end thereof and collar 8a comes into contact with collar 6a of release button 6 to push up collar 6a by the aforementioned spring force, and collar 6a is restrained by cap 5 by turning stop plate 7; thereby, the ascending position thereof is adjusted. Reference numeral 9 denotes a base plate onto which the upper bearing 10 of winding shaft 3 is fitted, and thereby winding shaft 3 is carried.

Figure 2:
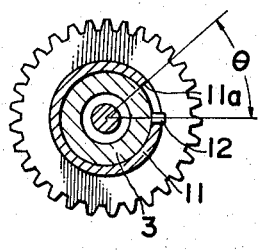
FIG. 2 is a cross-sectional plan view taken along line II—II in FIG. 1.

When winding gear 11, fitted rotatably on winding shaft 3 is turned by winding lever 2 counterclockwise from its rest position as far as angle $\theta$ shown in FIG. 2 to position it at its operating position, pin 12, provided projectingly on winding shaft 3, engages with notched end face 11a of winding gear 11 and the subsequent rotation of winding shaft 3 rotates winding gear 11 to drive a film winding mechanism (not shown in the drawings) and a shutter winding mechanism for cocking the shutter. Reference numeral 13 denotes a stop ring for winding gear 11, and 14 denotes a lower bearing fixed to camera body 1 for supporting winding shaft 3.

Reference numeral 16 denotes a holder for push button 18 fixed to the side wall of upper cover 15 by means of nut 17 which operates power source switch 25a. Push button 18 is slidably fitted in holder 16 and biased to jut out of holder 16 by compression spring 19; and restraining piece 20, formed on the internal end of push button 18, restrains push button 18 from jutting out, and simultaneously cooperates with a restraining lever to be described below. Compression spring 19 is inserted into holder 16 and then push button 18 is depressed so that the restraining piece is screwed or caulked onto the tip of push button 18.

Figure 3:
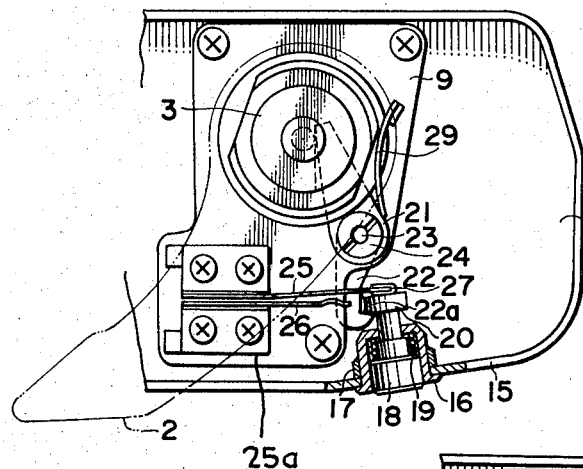
FIG. 3 is a partially cut-away plan view of the apparatus in the state shown in FIG. 1.

Reference numeral 21 denotes a lock lever fixed to shaft 23 by nut 24. Shaft 23 is carried rotatably on base plate 9 by bearing 28, and between base plate 9 and lock lever 21 spring 29 is provided, whereby shaft 23 has a counterclockwise rotating tendency. Lock level 21 is on the lever on which notch 3a of winding shaft 3 is formed, and when winding lever 2 is at its rest position and lock lever 21 is turned counterclockwise as shown in FIG. 3, a portion of lock lever 21 is passed through notch 3a and inserted into the lower side of collar 8a to lock the descending motion of collar 8a. And further, retaining lever 22 is fixed to shaft 23, and when push button 18 is depressed against spring 19, retaining lever 22 engages with restraining piece 20 and restrains push button 18 from returning in the direction to jut outwardly by the force of spring 19.

Reference numerals 25 and 26 are contacts of the power source switch provided on base plate 9, which are insulated from each other, and both contacts 25 and 26 have a tendency to close in contact with each other. The free end of contact 25 has an insulating tube 27 facing the end face of restraining piece 20 of push button 18. Therefore, when push button 18 is depressed against spring 19, restraining piece 20 separates contact 25 from contact 26 against the aforementioned closing tendency and opens the power source switch.

Because the present invention is formed as described above, in the positions shown in FIGS. 1 to 3, winding lever 2 is at its rest position and notch 3a of the winding shaft faces lock lever 21. When the contact of both contacts 25 and 26 of the power source switch is broken by depressing push button 18, hook 22a of retaining lever 22, having the aforementioned counterclockwise turning tendency, engages with restraining piece 20 to retain push button 18 in its depressed position. Concurrently therewith lock lever 21 is turned counterclockwise to be inserted into notch 3a and positioned on the lower side of collar 8a of release shaft 8 to effect a locking function.

Figure 4:
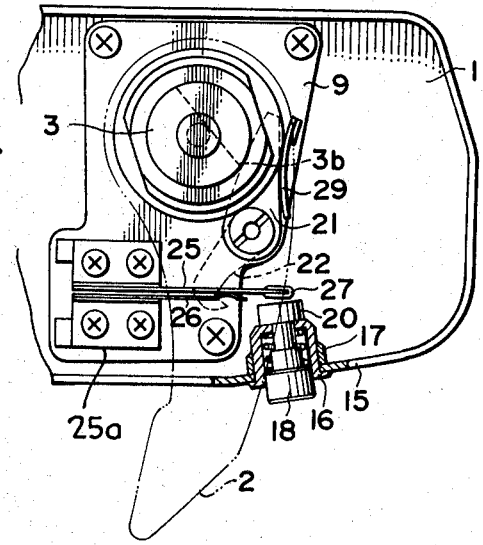
FIG. 4 is a partially cut-away plan view showing the apparatus at the time when the winding lever is at its operating position.

From such a positioning of the structure, upon turning winding lever 2 to the operating position for the preparation of the film wind-up operation shown by broken lines (as shown in FIG. 4) winding shaft 3 turns lock lever 21 clockwise against spring 29 by virtue of end face 3b to retract it from collar 8a, and simultaneously retaining lever 22 turns clockwise together with lock lever 21 and disengages from restraining piece 20 by hook 22a. Push button 18 is moved by spring 19 to a position to jut outwardly and contacts 25 and 26 of the power source switch come into contact with each other and the power source switch is closed.

Figure 5:
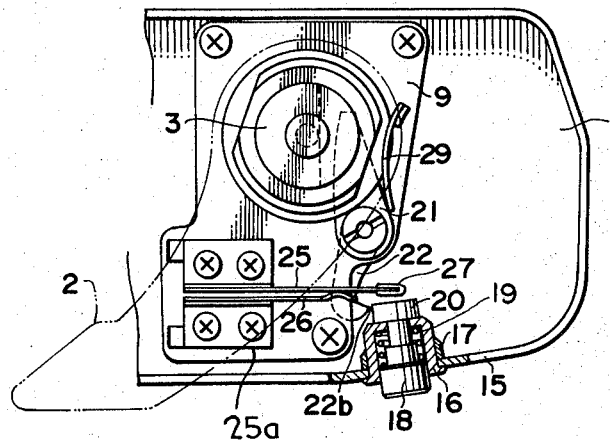
FIG. 5 is a partially cut-away plan view in the state when the winding lever is at its rest position and the operating button is not operated.

Even though winding lever 2 is turned to its rest position from the position shown in FIG. 4 without depressing push button 18 as shown in FIG. 5, tip 22b of hook 22a comes into contact with the side face of restraining piece 20 but without engaging with it. Therefore, lock lever 21 is not turned counterclockwise so far as to be in a position to engage with collar 8a so that the locking action is not effected. In this position, when push button 18 is depressed, hook 22a of retaining lever 22 engages for a time with restraining piece 20, and lock lever 21 is positioned on the lower side of collar 8a as shown in FIG. 3.

In the aforedescribed embodiment, as long as the push button is not manually depressed, once the power source switch is closed it is maintained in a closed position. However, in the embodiment shown in FIG. 6, when the cover is on the camera case and the camera is contained in the case, the push button is depressed and the power source switch is opened, but the internal structure thereof is quite the same as that of the first embodiment. Therefore, in describing the second embodiment the same numeral designations as those in the first embodiment are used to designate the same components.

Figure 6:
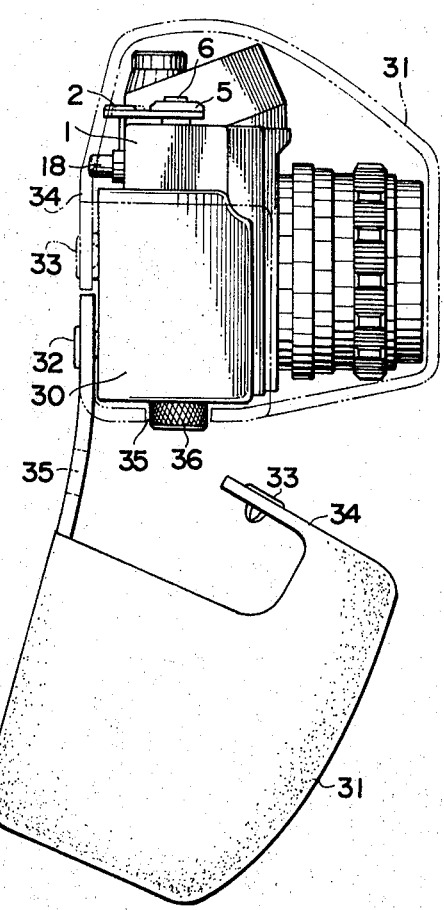
FIG. 6 is a side view of another embodiment in accordance with the present invention, showing the relation between the cover of the camera case and the push button.

With respect to FIG. 6, container 30 of the camera case is mounted on camera body 1 using set-screw 36 and container 30 enables the camera to be used for photography in the same way as with a conventional camera case.

Cover 31 for the camera case is detachably fixed by stud 32 to container 30, and when the camera is used for photography extends downwardly to expose the objective lens and the upper portion of the camera as shown by the full lines. In order to close the camera, cover 31 covers the objective lens and the upper portion of the camera as shown by the broken lines and is fixed to container 30 of the camera case by stud 33. In this embodiment, as described above, when cover 31 covers the camera body and the camera is not being used, push button 18 projecting from the upper portion of the camera body is depressed by portion 34 of case cover 31 to cover the upper rear portion of the camera, and breaks the contact of contact pieces 25 and 26 to open the power source switch as shown in FIGS. 3 and 6

The latter embodiment described above may be modified so that winding lever 2 is pressed into its rest position by case cover 31 covering the upper portion of the camera body, and the opening of the power source switch is retained by retaining lever 22. Additionally, the locking function is effected by release lock lever 21.

Figure 7:
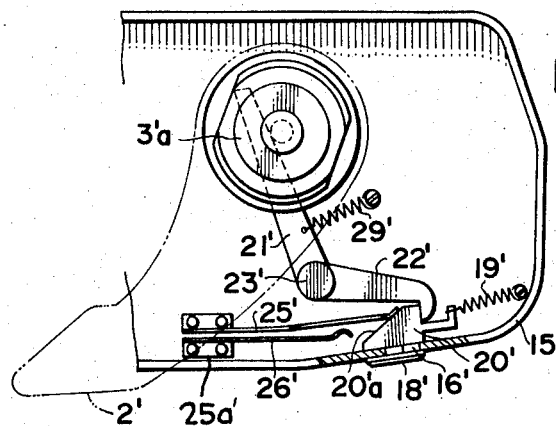
Figure 8:
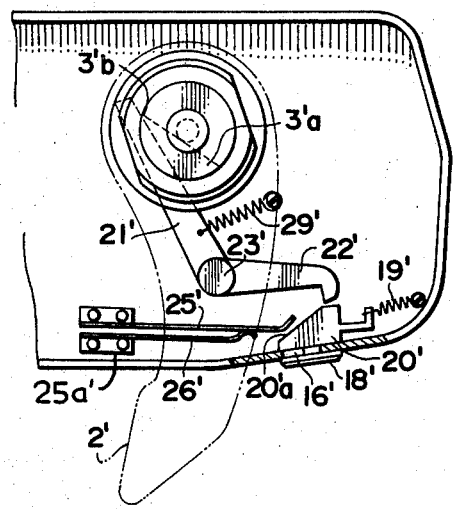
Figure 9:
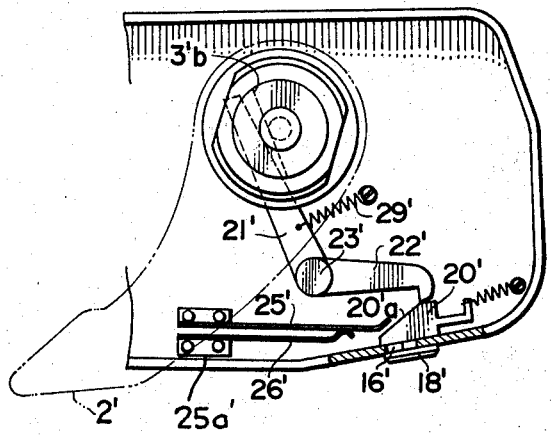

In the third embodiment shown in FIGS. 7, 8 and 9 the operating button is slidable relative to the camera outer case, while in the first and second embodiments the operating button is depressed inwardly and outwardly relative to the outer case of the camera. In the description of said third embodiment, the same numeral designations as those in the first embodiment are used for the corresponding components; however, apostrophe (') marks are used with the respective numerals. In this embodiment, lock lever 21' is given a clockwise turning tendency by spring 29' so as to come into contact with the left side of winding shaft 3 in the drawings. Although, when winding lever 2' is situated at its rest position shown in FIGS. 7 and 9, arcuate notched slot 3a' of winding shaft 3' faces lock lever 21' and lock lever 21' is turned clockwise as shown in FIG. 7. Lock lever 21' locks the release operation of the release shaft in the same manner as shown in FIG. 3 in the case of the first embodiment.

Retaining lever 22' is fixed coaxially to rotary shaft 23' of lock lever 21'. Operating button 18', extending outside the camera outer case 15', can be moved slidably in guide slot 16' formed on camera outer case 15'. Inside camera outer case 15', restraining piece 20', mounted to operating button 18', is provided. Between restraining piece 20' and the camera body, spring 19 is spread to urge restraining piece 20' and operating button 18' to one end of guide slot 16'. Vertical end face 20'b is formed on restraining piece 20' for engaging with the hook on the tip of retaining lever 22' (as described below) on the side on which the spring is spread; and on the opposite side thereof slant face 20'a is formed for operating contact 25' of power source switch 25a'. The hook on the tip of retaining lever 22' is also in contact with slant face 20'a.

Contacts 25' and 26' of power source switch 25a' are given a tendency to close by coming into contact with each other and are fixed to the camera case. When operating button 18' and restraining piece 20' are slid manually to the left in the drawings against spring 19', slant face 20'a of restraining piece 20' separates contact 25' from contact 26' against its closing tendency to open switch 25a'. That is, as shown in FIG. 7, when winding lever 2' is situated at its rest position and operating button 18' is slid manually to the left in guide slot 16' against spring 19, the hook of retaining lever 22' is turned clockwise by spring 29' and engages with the vertical end face 20'b of restraining piece 20' to restrain it. And also lock lever 21' is fitted in arcuate notched slot 3a' to lock the release shaft and concurrently therewith power source switch 25a' is opened.

From the above positioning of the elements, when winding lever 2' is turned to its operating position, end portion 3'b of arcuate notch 3'a engages with lock lever 21' to turn it counterclockwise against spring 29' as shown in FIG. 8 which, in turn, rotates retaining lever 22' counterclockwise, so that the engagement of retaining lever 22' and restraining piece 20' is released and restraining piece 20' slides together with operating button 18' to the right end of guide slot 16' by means of spring 19'. Thereby, slant face 20'a of restraining piece 20' releases the restraint of contact 25' and power source switch 25a' is closed through its normal closing tendency.

From the above condition of the elements, even though winding lever 2' is turned to its rest position, the tip of retaining lever 22' engages with slant face 20'a as shown in FIG. 9 and cannot be turned clockwise by spring 29'. Therefore, lock lever 21' retreats from the position where release shaft is locked, and power source switch 25a' is maintained closed. Then, when operating button 18' is moved manually to the left against spring 19', the positioning shown in FIG. 7 is obtained, and the release lock and the opening of the power source switch can be effected.

It will be understood by those skilled in the art that the embodiment of the invention shown and described herein is subject to modification without departing from the scope and spirit of the invention. Accordingly, it should be understood that the invention is not limited by the embodiment shown and described.

What is claimed is:

1. In a photographic camera having an electric circuit and a battery power source therefor, a switch operating device, comprising:
   a camera housing;
   a power source switch having a normally closed position for connecting said battery power source to said electric circuit;
   an operating button mounted to said housing and movable between first and second positions;
   means for biasing said operating button to said first position;
   a restraining member mounted to said operating button for opening said power source switch with said operating button in said second position;
   a winding lever rotatable between a rest position, an operating position and a position for winding the camera film and cocking the shutter;
   a retaining lever rotatably mounted to said camera housing for engaging with said restraining member when said operating button is moved to said second position with said winding lever at said rest position to retain said restraining member at a position to open said power source switch, and the engagement between said restraining member and said retaining lever is released with said winding lever at said operating position to close said power source switch.

2. A switch operating device as in claim 1 wherein said housing includes an aperture, said operating button is mounted within said aperture and biased to one end thereof, whereby said restraining member moves from engagement with said power source switch and said retaining lever.

3. A switch operating device as in claim 2 wherein said restraining member includes an end face and an oppositely disposed slanted face, said retaining lever includes a hook for engaging said end face; said power source switch includes first and second normally closed contacts, whereby said slanted face engages one of said contacts with said operating button in said second position to separate said first and second contacts.

4. A switch operating device as in claim 1 wherein said operating button includes a member for engaging with said restraining lever with said operating button in said second position, and said operating button further includes a surface oppositely disposed from said member for engaging and projecting from said camera housing with said operating button in said first position.

5. A switch operating device as in claim 4 further comprising a cover movable between a position for covering said housing and a position for uncovering said hosuing and wherein said operating button is depressed to said second position and said restraining member opens said power source switch with said cover covering said housing; and said retaining lever engages said restraining member with said winding lever at said rest position.

6. A switch operating device as in claim 5 wherein said operating button is in said first position to close said power source switch and rotate said winding lever to said rest position with said cover in said position for uncovering the camera, and said retaining lever is disengaged from said restraining member.

7. A switch operating device as in claim 1 further comprising:
   a winding shaft mounted within said housing and rotated by said winding lever, said winding shaft including a bore centrally located with respect to the axis of rotation of said winding shaft;
   a release shaft rotatably mounted within said bore and movable in an axial direction within said bore for releasing the shutter, said release shaft including a collar;
   a locking lever mounted on said camera housing coaxially with said retaining lever and biased for contacting said winding shaft; and
   said winding shaft including an arcuate slot extending in a radial direction between said winding shaft and said bore, said arcuate slot facing said locking lever with said winding lever in said rest position whereby said locking lever engages said collar with said operating button in said second position, said winding shaft and arcuate slot are rotated to release the engagement of said winding lever and said locking lever with said winding lever moved from said rest position to said operating position.

8. In a photographic camera having an electric circuit and a battery power source, a switch operating device comprising:
   a camera housing;
   a switch for connecting said battery power source to said electric circuit;
   a switch operating button mounted to said housing and movable between a first position for closing said switch and a second position for opening said switch;
   means for biasing said switch operating button to said first position;
   means mounted in said housing for retaining said switch operating button at said second position to open said switch;
   a winding lever rotatable for winding the camera film and clocking the shutter; and
   means for releasing said switch operating button from engagement with said retaining means upon the rotation of said winding lever to close said switch.

9. A switch operating device as in claim 8 wherein said winding lever is rotatable from a rest position to an operating position preparatory to the film winding operation, where said means for releasing releases said switch operating button from engagement with said retaining means upon rotation of said winding lever from said rest position to said operating position to close said switch.

10. A switch operating device as in claim 9 wherein said means for releasing is a rotatable member connected with said winding lever for releasing said switch operating button from engagement with said means for retaining upon the rotation of said winding lever from said rest position to said operating position to close said switch.

11. A switch operating device as in claim 10 wherein said switch operating button is movable between a released position and a depressed position, each corresponding to said first and second positions respectively.

* * * * *